United States Patent
Bird et al.

(10) Patent No.: US 6,657,954 B1
(45) Date of Patent: Dec. 2, 2003

(54) ADAPTING RECEIVER THRESHOLDS TO IMPROVE RATE-BASED FLOW CONTROL

(75) Inventors: Raymond F. Bird, Durham, NC (US); Ralph Benjamin Case, Raleigh, NC (US); Brad Alan Makrucki, Durham, NC (US); James John Martin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,691

(22) Filed: Mar. 31, 1999

(51) Int. Cl.[7] .............................................. H04L 12/26
(52) U.S. Cl. ........................ 370/229; 370/465; 709/223
(58) Field of Search ................................ 370/229, 230, 370/230.1, 231, 232, 233, 234, 235, 252, 465, 466, 468, 235.1, 236.1, 236.2; 709/223

(56) References Cited

U.S. PATENT DOCUMENTS

| | | | | |
|---|---|---|---|---|
| 5,367,523 A | * | 11/1994 | Chang et al. ................ 370/235 |
| 5,515,359 A | * | 5/1996 | Zheng ......................... 370/231 |
| 5,864,538 A | * | 1/1999 | Chong et al. ............. 370/236.1 |
| 5,949,758 A | * | 9/1999 | Kober ......................... 370/232 |
| 6,115,393 A | * | 9/2000 | Engel et al. ................. 370/469 |
| 6,178,448 B1 | * | 1/2001 | Gray et al. .................. 709/224 |
| 6,412,000 B1 | * | 6/2002 | Riddle et al. ............... 709/224 |
| 6,456,590 B1 | * | 9/2002 | Ren et al. .................... 370/229 |
| 6,456,630 B1 | * | 9/2002 | Packer et al. ................ 370/466 |
| 6,470,025 B1 | * | 10/2002 | Wilson et al. ............... 370/462 |

* cited by examiner

Primary Examiner—Dang Ton
Assistant Examiner—Tri H. Phan
(74) Attorney, Agent, or Firm—Jeanine S. Ray-Yarletts; Marcia L. Doubet

(57) ABSTRACT

A technique for adapting receiver thresholds to improve rate-based flow control in a data communications network. With this invention, the flow control process becomes self-calibrating such that threshold values are dynamically adjusted to adapt to current network conditions, without requiring user intervention. Several different indicators of network conditions are monitored, and appropriate adjustments are made to the threshold(s) upon detecting these specific indicators. One monitor enables the threshold to increase when the network is uncongested, enabling the sender to increase its transmission rate. Conversely, the threshold is lowered if the network is congested, so that the transmission rate will be decreased. Another monitor balances bandwidth allocation among connections sharing a bottleneck resource, by lowering the threshold (and therefore decreasing the send rate) when a connection uses a high share of the resource. A third monitor detects the presence of traffic from protocols not using adaptive receiver thresholds, and adjusts the threshold (including an upper and lower threshold bound) in order to compete fairly for resources with these other protocols. The monitors may be implemented individually or in combination.

21 Claims, 8 Drawing Sheets

FIG. 6

Link Rate Table

| Bottleneck Link Rate | Maximum Receiver Threshold (msec) | Minimum Receiver Threshold (msec) | Idle_Time_Threshold (sec) | Leaky Bucket Capacity (bytes) | Leaky Bucket Drain Rate (bytes/msec) |
|---|---|---|---|---|---|
| 16 Mbps | 37 | 17 | 20 | 30000 | 50 |
| 10 Mbps | 37 | 17 | 20 | 25000 | 30 |
| 8 Mbps | 48 | 21 | 20 | 25000 | 20 |
| 6 Mbps | 63 | 28 | 20 | 20000 | 20 |
| 4 Mbps | 79 | 35 | 20 | 15000 | 12 |
| 3 Mbps | 120 | 53 | 20 | 12000 | 9 |
| 2.1 Mbps (E1) | 160 | 70 | 20 | 10000 | 6 |
| 1.55 Mbps (T1) | 210 | 93 | 20 | 10000 | 5 |
| 1 Mbps | 314 | 139 | 20 | 10000 | 3 |
| 500 kbps | 417 | 185 | 20 | 7000 | 2 |
| 250 kbps | 470 | 208 | 20 | 6000 | 0.8 |
| 100 kbps | 500 | 222 | 20 | 5000 | 0.3 |
| 64 kbps | 1140 | 500 | 20 | 5000 | 0.2 |

ADAPTING RECEIVER THRESHOLDS TO IMPROVE RATE-BASED FLOW CONTROL

BACKGROUND OF THE INVENTION

1. Field of the Invention

The present invention relates to the field of computer programming, and more particularly to a method, system, and computer readable code for adapting receiver thresholds to improve rate-based flow control in a data communications network.

2. Description of the Related Art

Flow control is a technique known in the computer programming art whereby the rate at which data traffic sent into a data communications network is managed for various optimizations. If too much data is being sent from a sending component to a receiving component, the buffers in which data is stored at intermediate nodes along the path between them (or at the receiver itself) may overflow, causing loss of data packets or the need to resend them. Or, if the buffers do not actually overflow, the network may become congested under heavy transmission loads, resulting in delays and inefficiencies. On the other hand, if the sender has data to be sent, but is sending it at a very slow rate when excess capacity exists in the network, then network resources such as network bandwidth are not being used efficiently. Flow control involves monitoring the current conditions of the network, and adjusting the rate at which data is sent according to these conditions. When the network appears to be congested, the rate of sending new data messages into the network is reduced. When there appears to be excess capacity available, the rate of sending messages can be increased. In this manner, rate-based flow control "adapts" transmission rates to the current network conditions.

A specific implementation of rate-based flow control will now be discussed, in order to clearly illustrate how this technique operates. The High Performance Routing or "HPR" technology developed by the International Business Machines Corporation ("IBM") is a technique for optimizing routing and network availability in SNA (Systems Network Architecture) networks. HPR is also known in the art, and will not be described in detail herein. Rate-based flow control is used within HPR networks, and functions by having the sender component periodically send a message to the receiver component asking for feedback on the current transmission rate. In HPR terminology, the sender sends a "rate request" message, and the receiver's response is a "rate reply" message. The receiver's reply tells the sender how, from the receiver's perspective, the rate of sending data into the network ought to be changed. For example, the rate reply message may tell the sender to slow down (because the receiver believes the network is congested, or is experiencing buffers or queues that are at or near capacity). Alternatively, the rate reply message may tell the sender to speed up its transmission rate, or to continue without change to the rate.

The receiver makes the determination of how to respond to the sender by monitoring network conditions. In HPR, this is done by comparing delays in arrival of the rate request messages, as shown in FIG. 3. The sender sends a first rate request message at some time "T1", which the receiver receives at some later time "T2". The sender subsequently sends a second rate request message at a time "T3", received by the receiver at time "T4". Each rate request message contains the sender's measurement interval (i.e. how much time elapsed between sending these two rate request messages), computed by the sender as T3 minus T1. The receiver then subtracts its own receive time T2 from T4, to determine how much time elapsed between its receipt of the two messages. When the interval between receiving T2 and T4 is greater than the interval between sending T1 and T3, this indicates that the second rate request message was slowed down during its traversal of the network (due, for example, to congestion), and is used as a representative measure of the conditions being experienced for other data messages between the same sender and receiver. The larger the difference between the receiver's interval and the sender's interval, the greater the delay that is being experienced in the network. Alternatively, if transmission through the network is improving, the difference in the intervals may be negative, indicating that perhaps the first message experienced network delays while the second did not.

In HPR's flow control, the difference between the receiver's interval and the sender's interval is referred to as the "delay change". Delay change values are accumulated by the receiver over time, in a value referred to as the "delay change sum" or summation, in order to achieve a smoothing effect in interpreting network conditions. That is, some delay change values will be positive, and some will be negative, as conditions fluctuate. By accumulating the values over time, the HPR flow control technique avoids overreacting to transient situations. When a representative value for the delay change sum (hereinafter, "DCS") is available, it is compared to a predetermined threshold value. If the DCS is above the threshold, then too much delay is being experienced. This tells the receiver that the appropriate response for the rate reply message is "slow down". If the DCS is below the threshold, the sender is told to "speed up".

The thresholds used in known flow control systems (including HPR), however, are fixed values. These fixed values are determined by static analysis of the system's behavior under a certain set of conditions (such as a predicted number of simultaneous connections, the link capacity of the underlying connections, etc.). There are a number of drawbacks to using a fixed threshold value. For example, it may be that the existing conditions are different than expected, such that the static threshold does not properly control transmission rates. Or, link capacity may have been added to a bottlenecked link after the system became operational, as can occur when multi-link transmission groups are used. Aware of the drawbacks when using static thresholds, some rate-based flow control systems provide for a user to intervene and adjust the threshold values. This is quite error-prone, however, because a number of complex interrelated factors must be considered when choosing a proper threshold value. In addition, it provides only a temporary solution as conditions may change again, making the new threshold no longer adequate.

Accordingly, what is needed is a technique whereby threshold values can be dynamically adjusted to adapt to current network conditions, without requiring user intervention. The present invention addresses this problem by providing a technique for monitoring several different indicators of network conditions, and defines appropriate adjustments to be made to the thresholds upon detecting these specific indicators.

SUMMARY OF THE INVENTION

An object of the present invention is to provide a technique for dynamically adjusting receiver thresholds to adapt to current network conditions.

Another object of the present invention is to provide this technique without requiring user intervention.

A further object of the present invention is to provide this dynamic adjustment by monitoring specific indicators of network congestion.

Yet another object of the present invention is to provide this technique in a manner that detects the presence of protocols which do not use adaptive receiver thresholds for flow control, and to provide a threshold adaptation for this situation.

Still another object of the present invention is to provide receiver threshold adaptation using a software-implemented solution.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer-readable code for adapting receiver thresholds to improve rate-based flow control in a data communications network. In one aspect, this comprises: detecting a foreign protocol operating in the network; and setting a receiver threshold to a maximum value when the foreign protocol is detected. In another aspect, this comprises: monitoring a percentage of increase messages sent by a receiver to a sender during a recent interval; and using the percentage of increase messages to interpolate a receiver threshold between a maximum value and a minimum value. In a further aspect, this comprises: monitoring a link utilization rate of a connection during a recent interval; and using the link utilization rate to adjust a receiver threshold. In yet another aspect, this comprises: detecting a foreign protocol operating in the network; monitoring a percentage of increase messages sent by a receiver to a sender during a recent interval; monitoring a link utilization rate of a connection during the recent interval; setting a receiver threshold to a maximum value when the foreign protocol is detected; and setting the receiver threshold when the foreign protocol is not detected. In this aspect, setting the receiver threshold further comprises: using the percentage of increase messages to interpolate the receiver threshold between a maximum value and a minimum value; and using the link utilization rate to adjust the receiver threshold. The process of detecting a foreign protocol may further comprise: monitoring an average value of a delay change sum; monitoring a variance in the delay change sum; monitoring a responsiveness to one or more decrease messages; determining that the foreign protocol is detected when said the monitored average value is higher than an expected average value; determining that the foreign protocol is detected when the monitored variance is larger than an expected variance; and determining that the foreign protocol is detected when the monitored responsiveness is less than an expected responsiveness.

The present invention will now be described with reference to the following drawings, in which like reference numbers denote the same element throughout.

BRIEF DESCRIPTION OF THE DRAWINGS

FIG. 6 depicts an example of a link rate table that may be used with the present invention.

DESCRIPTION OF THE PREFERRED EMBODIMENT

Figure 1:
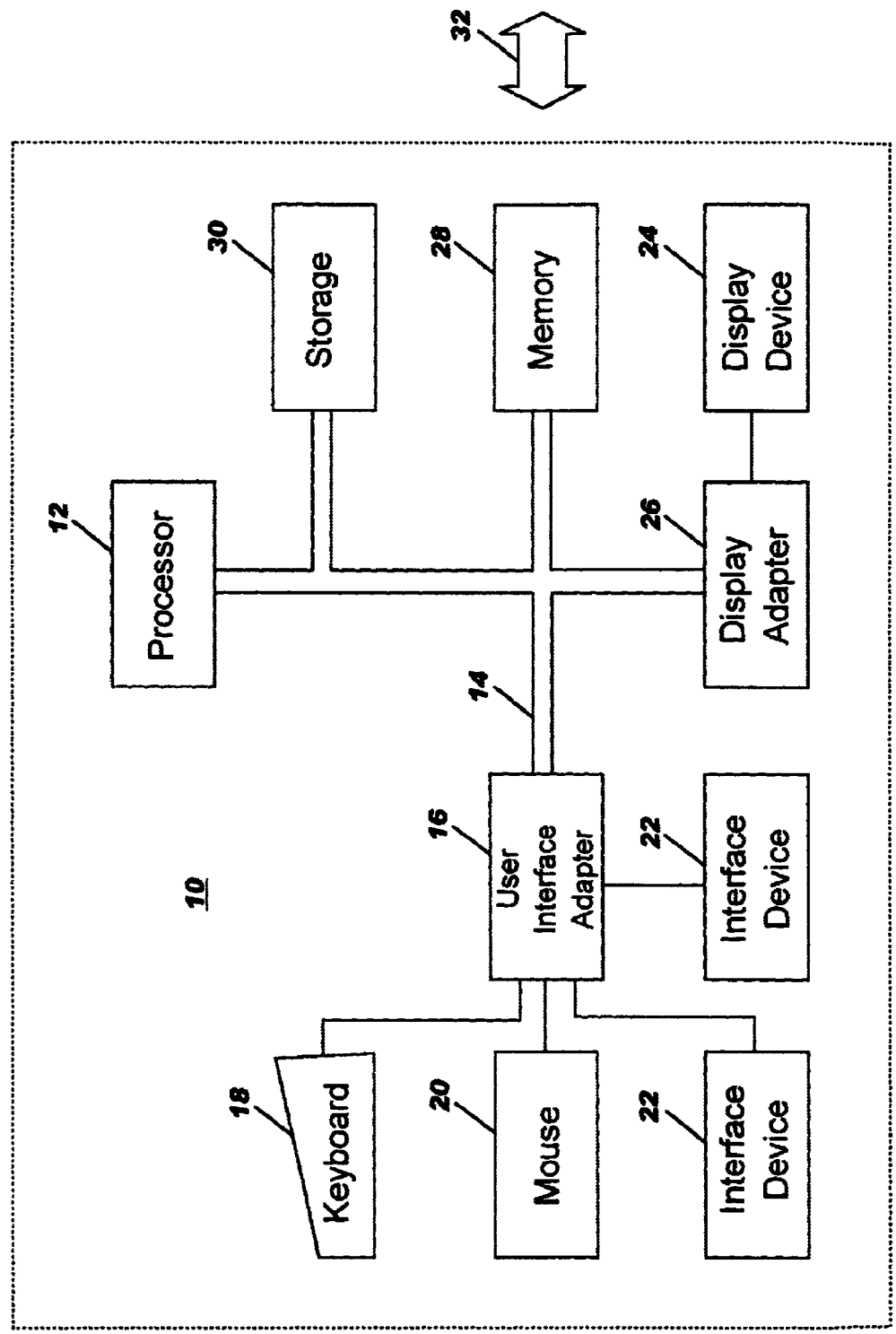
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a WAN, or the workstation 10 can be a client in a client/server arrangement with another computer, etc. All of these configurations, as well as the appropriate communications hardware and software, are known in the art.

Figure 2:
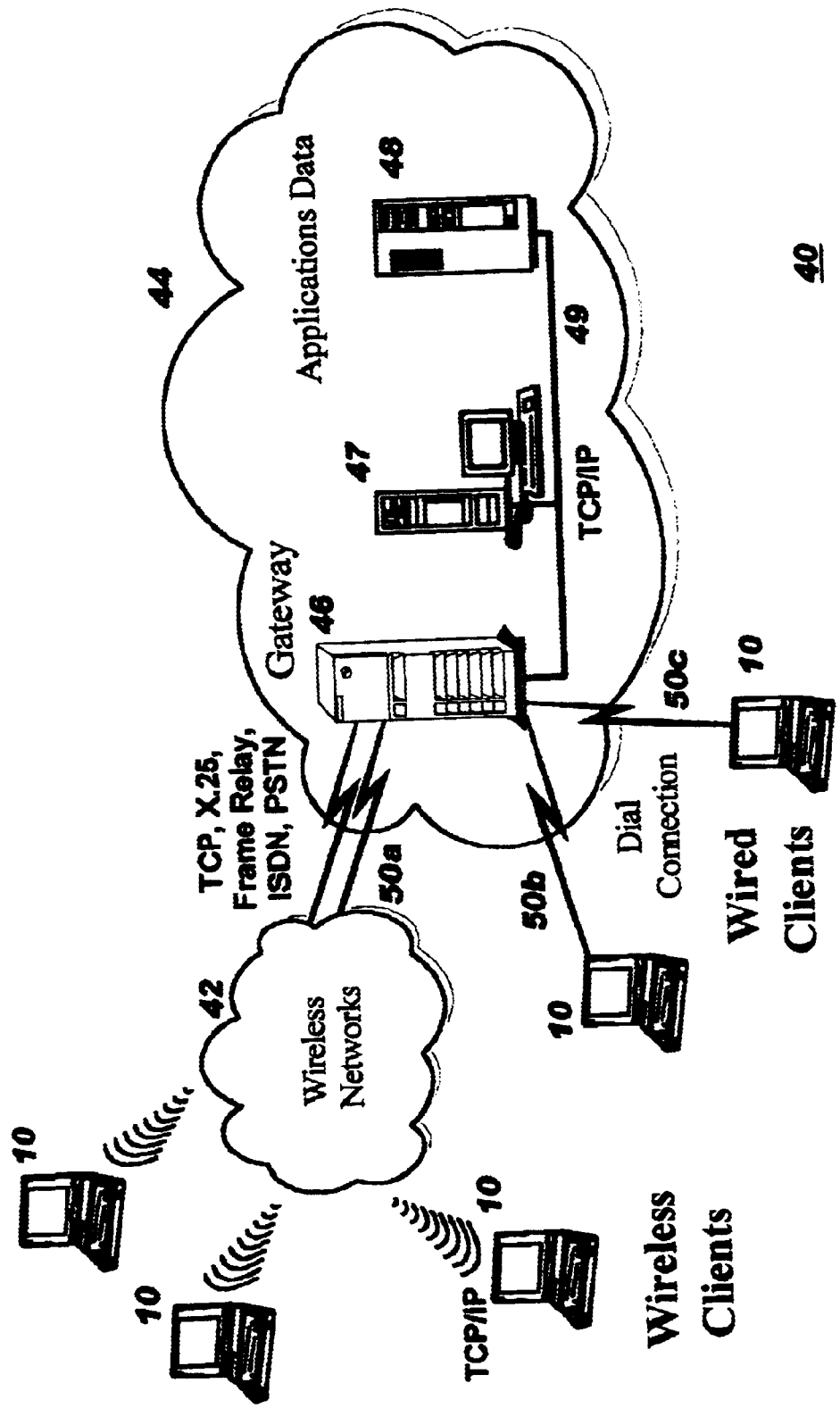
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The present invention may operate in a workstation, a server, a router, a gateway, a mainframe, or any other device capable of functioning as an HPR endpoint (i.e. as either a receiver component or a sender component). A computer functioning as a receiver component and implementing the present invention may be connected to a computer functioning as a sender component using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The computer functioning as a receiver component may be any type of computer processor, including laptop, handheld or mobile computers; vehicle-mounted devices; desktop computers; mainframe computers; etc., having processing and communication capabilities. The computer functioning as a sender component, similarly, can be one of any number of different types of computer which have processing and communication capabilities. These techniques are well known in the art, and the hardware devices and software which enable their use are readily available. Hereinafter, a computer functioning as a receiver component will be referred to equivalently as a "receiver component", "receiving component" or "receiver", and a computer functioning as a sender component will be referred to as a "sender component", "sending component", or "sender".

The computing environment in which the present invention may be used includes an Internet environment, an intranet environment, an extranet environment, or any other type of networking environment. These environments may be structured using a client-server architecture, or a multi-tiered architecture, whereby a client-server environment is extended by adding data repositories as an additional tier (such that one or more servers now occupy the tiers in the middle), and where these data repositories contain information that may be accessed by the server as part of the task of processing the client's request.

The preferred embodiment of the present invention will now be discussed with reference to FIGS. 3 through 6.

In the preferred embodiment, the present invention is implemented as a computer software program. The program code of the preferred embodiment may be implemented as objects (classes and methods) in an object-oriented programming language, or as functions or subroutines in a procedural programming language. The program implementing the present invention may be used advantageously in any system where flow control techniques are employed to control the rate at which a sending component transmits data (including messages, files, etc.) into a network and requests feedback from a receiving component on the transmission rate.

The techniques of the present invention monitor indicators of network conditions at a receiver component. When specific conditions are detected, the receiver adapts its threshold according to algorithms defined herein. As stated previously, a threshold is a value used by a receiver to determine whether the sender needs to increase or decrease the rate at which it puts data traffic into the network. The receiver compares an accumulated delay change sum (see FIG. 3) to the threshold value, and uses the result to respond to the sender's request for flow control feedback. Prior art receiver thresholds used static values. The dynamic threshold adaptation of the present invention enables the receiver to more accurately respond to the sender's requests for feedback. The sender can then use this more-accurate feedback to make adjustments to the transmission rate that result in more immediate reaction to network conditions than was possible with prior art techniques. The present invention applies to the monitoring of conditions, and threshold adaptation performed in response to these conditions, that are performed by the receiver. Actions taken by the sender are outside the scope of this invention.

By adapting the threshold to accommodate the current conditions in the network, the system's overall robustness, stability, and fairness can be significantly improved. Techniques for monitoring three specific indicators of network conditions are defined herein. Each of these techniques may be used separately, or they may be used in combination. Using these techniques provides for self-calibration of the receiver threshold, without the need for a user to make threshold adjustments. This self-calibration is useful for dynamically detecting, and quickly responding to, unexpected conditions in the network. For example, the threshold may have been set incorrectly originally, based upon incorrect predictions about such things as network load, link speed, etc. Or, bandwidth may have been added after the threshold was originally set, so that the original setting was correct at the time but no longer is appropriate for the current capacity. The present invention also detects a sender that is just "ramping up", i.e. just beginning to send data, and allows the sender to come up to speed very quickly. This situation is detected by a first monitor that keeps track of the percentage of "increase" messages sent over a recent interval. This monitor also detects the presence or absence of congestion in the network, and adjusts the threshold in response. A higher threshold is used when the network is not congested, so that more increase messages will be sent to the sender, requesting the sender to increase its transmission rate. Conversely, the threshold is lowered when congestion is detected, so that the sender will decrease the transmission rate. A second monitor adapts the threshold in order to balance bandwidth allocation among the connections that are sharing a given bottlenecked link, to ensure that each connection gets a fair share of that resource (and the associated buffers and processor cycles for performing routing operations). In this manner, a fair allocation of link capacity in the presence of sustained transmissions (i.e. those that use a large share of the link) can be made. A third monitor detects the presence of traffic in the network that originates from a foreign protocol (that is, a protocol other than one using the adaptive receiver threshold techniques of the present invention). Upon detecting this type of traffic, adjustments are made to the threshold (including the upper and lower bounds within which the threshold can range) to ensure fair competition with the foreign protocol(s) for shared resources. The process that responds to the presence of such traffic will be referred to herein as the "competer" mode of operation. Each monitor and its corresponding threshold adaptations will now be discussed in more detail.

In the preferred embodiment, a table of values is used such as that shown in FIG. 6. This table is indexed by link rate 665, and the entry 660 for each particular link rate includes a maximum threshold setting 670 and a minimum threshold setting 675, and may include other information as well. The appropriate link rate entry (i.e. the appropriate row from this link rate table) to use for calculations by a particular receiver will preferably be configured initially from knowledge of network topology, using techniques which are known in the art and do not form part of the present invention. Adaptations of the receiver threshold based on this initial information then occur dynamically according to the present invention, without requiring further intervention by a user.

Figure 4:
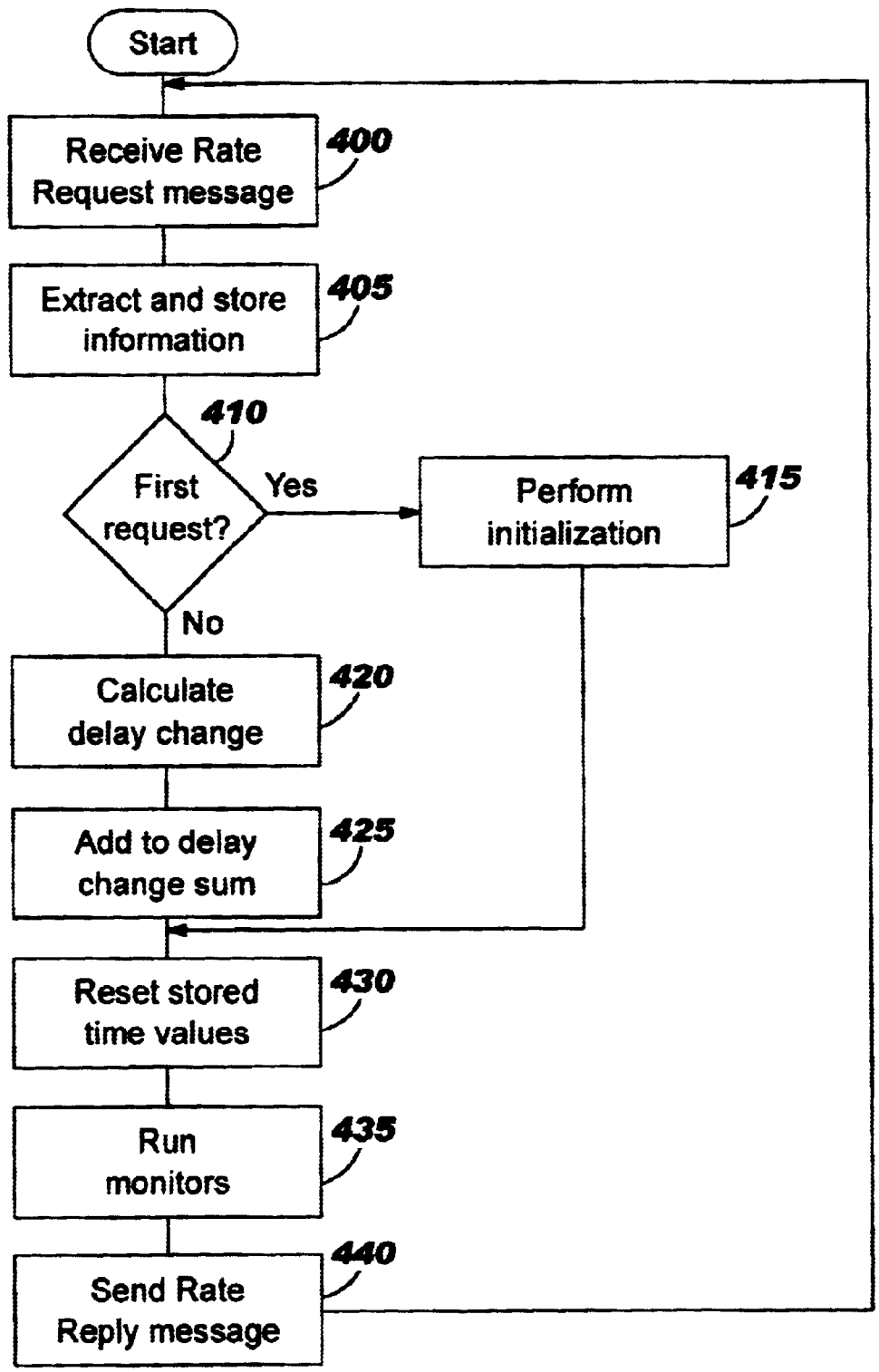
FIG. 4 provides a flowchart illustrating the logic with which a receiver responds to a request for feedback on transmission rates, invoking the logic of the present invention.

FIG. 4 illustrates the logic that is invoked in a preferred embodiment each time a rate request message is received from the sender. Note that this flowchart does not represent the details of the inventive concepts of the present invention, but instead provides the context in which the present invention is implemented. Blocks 415 and 435 of FIG. 4 provide function related to the novel concepts of the present invention.

Figure 3:
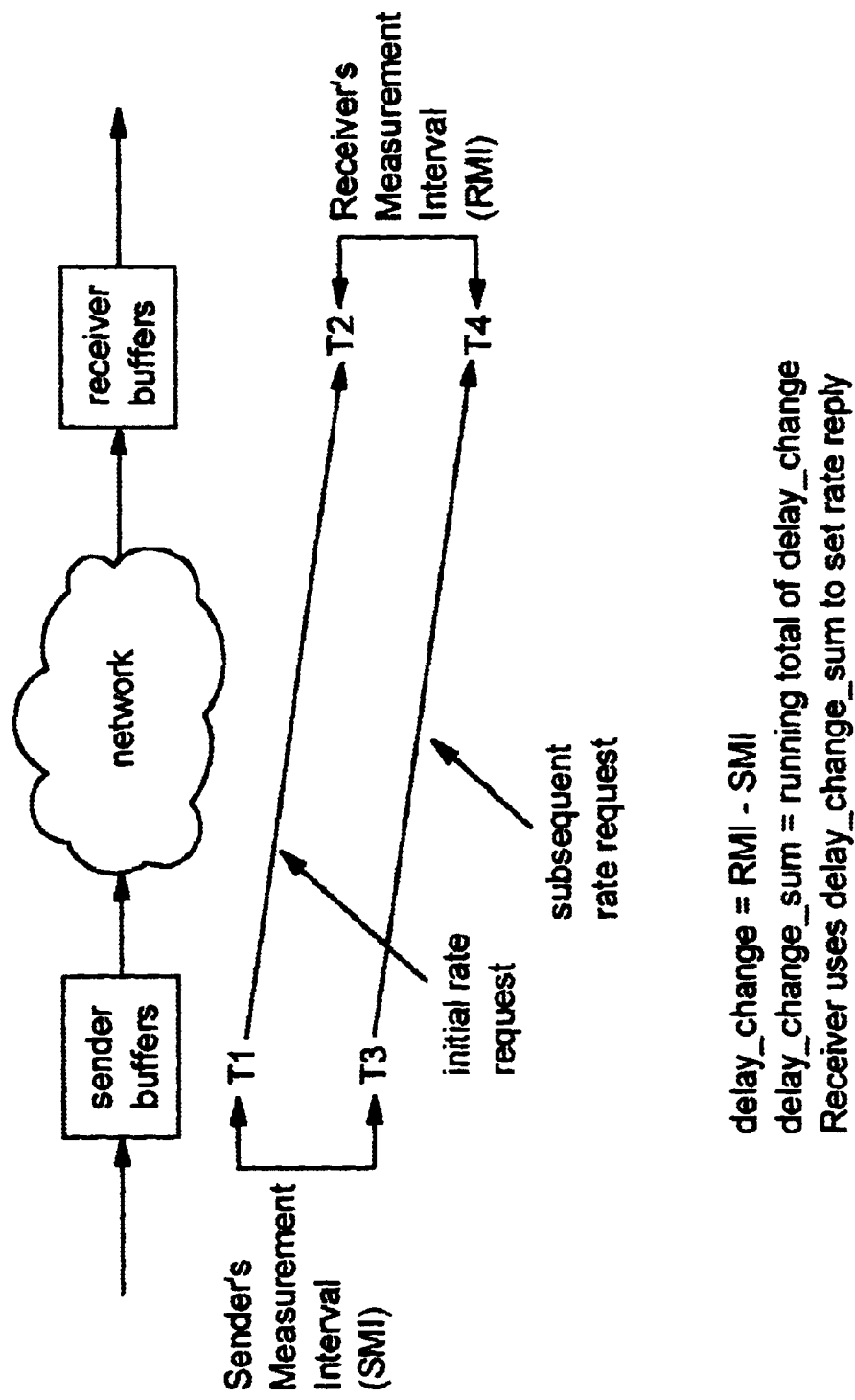
FIG. 3 shows a depiction of inter-arrival times used to calculate delay change in HPR rate-based flow control, according to the prior art.

Block 400 indicates receipt of the rate request message. It will be obvious that this block represents a wait condition, such that control transfers from Block 400 to Block 405 only when a new rate request message has been received. Techniques for implementing this type of blocking wait are well known in the art. At Block 405, information is extracted from this message and stored. As discussed previously with reference to FIG. 3, the sender's measurement interval is included in the message content. That information is to be extracted for use in the calculation of the delay change, and is stored in a variable that is depicted in FIG. 3 as "SMI". The receiver also notes the time at which it received this message (by invoking a function provided by the operating system to retrieve the value of the system clock, for example). This receive time is stored in a variable depicted in FIG. 3 as "T4".

Block 410 asks whether this is the first rate request message to be received. If so, then there are no stored values for comparing to the current send time and receive time, so the delay change cannot be calculated. Block 415 performs an initialization routine in this situation, after which control transfers to Block 430. Otherwise, when the test in Block 410 has a negative result, control continues to Block 420 to calculate the network delay which this rate request message experienced.

The initialization routine represented at Block 415 sets initial values for use in the threshold adaptations. The meaning of the variables into which initial values are stored will be discussed in more detail below, with reference to using the variables according to the logic depicted in FIGS. 5A–5C. The "delay_change" and "delay_change_sum" values (corresponding to the values calculated in Blocks 420 and 425, discussed below) are initialized to zero. The receiver threshold is initialized to the maximum value 670 (see FIG. 6) for the current link rate 660. The initial message type is set to "increase". An initial window size setting of −1.0 is used in the preferred embodiment, to force bypassing the first calculation of the variable "N_fraction", which will be discussed below with reference to Block 620. A variable "Range_Size" is computed by subtracting the minimum receiver threshold 675 from the maximum receiver threshold 670. In addition, the following variables are initialized to zero: DCS_window_count, Number_Of_Increases, Smoothed_Rate, DCS_Max_Overall, Recovery_Factor, N_Fraction_Trend, DCS_mean, DCS_mean_squared. The variable Present_Thr_Max is set to the maximum receiver threshold 670, and Anticipated_Variance is set to the square of the maximum receiver threshold.

At Block 420, it is known that time values exist for computing delay between receipt of a prior rate request and of the just-received request. Block 420 calculates the receiver's delay as (T4−T2). The sender's measurement interval is then subtracted from the receiver's delay. The result represents the delay change for this message (and may be a negative delay change value if the second message took less time to reach the receiver than did the first message), and is stored in a variable referred to herein as "delay_change". The delay change is added to an accumulator of delay change, referred to herein as the variable "delay_change_sum", at Block 425.

Control reaches Block 430 following completion of Blocks 415 and 425. Block 430 resets the stored receive time values, moving the new time value T4corresponding to the just-received message into the time value for a prior message (T2) in preparation for the next iteration through the logic of FIG. 4. Block 435 then invokes operation of the monitors. In a first preferred embodiment of the present invention, all three monitors are implemented and used in combination. For this embodiment, Block 435 corresponds to invoking the subroutine depicted in FIGS. 5A–5C.

Following completion of the monitor processing, Block 440 uses the newly-calculated receiver threshold to send a rate reply message, indicating that either an increase or a decrease in transmission rates is appropriate. Control then returns to Block 400 to await arrival of the next rate request message from the sender.

FIRST PREFERRED EMBODIMENT

Figure 5A:
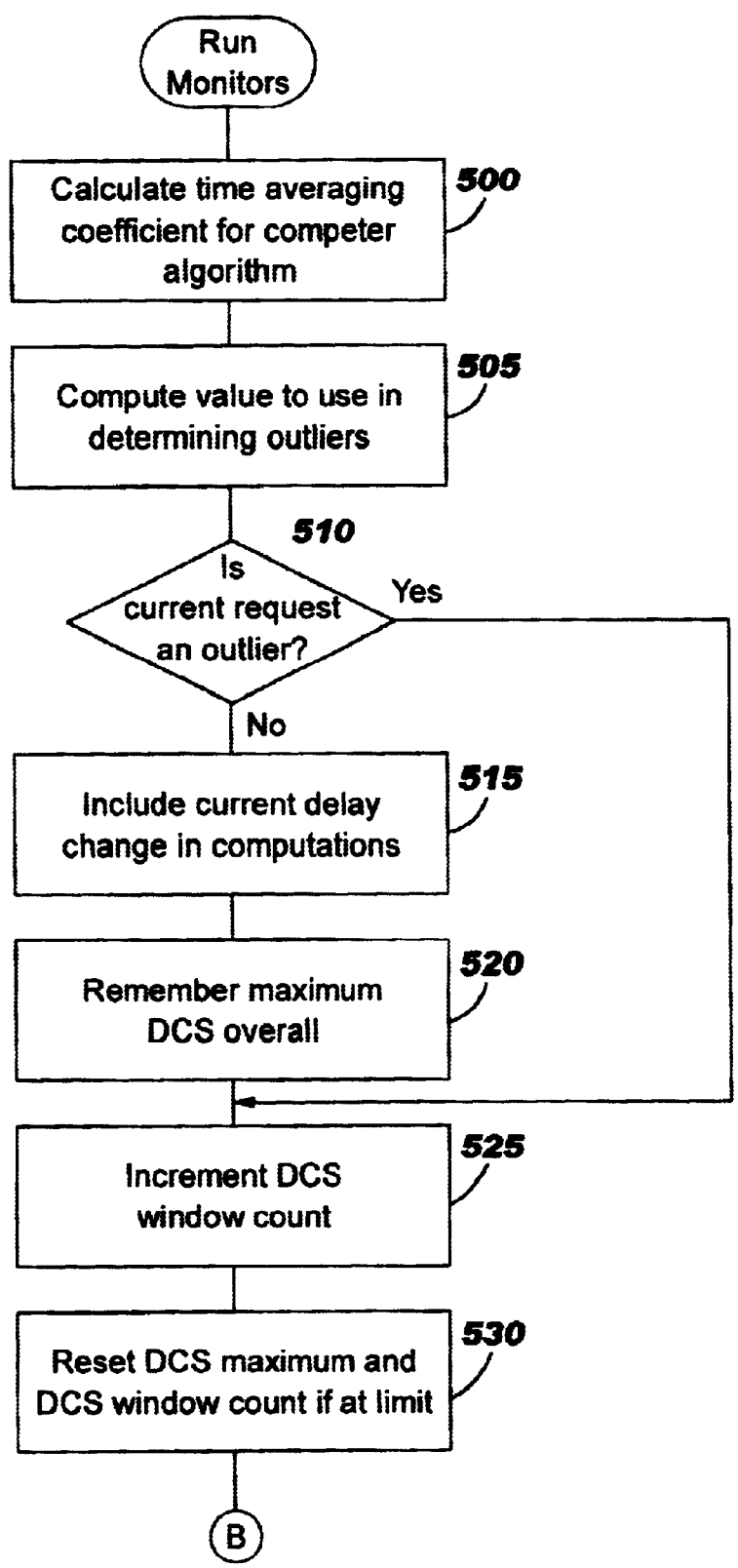
FIGS. 5A–5C provide a flowchart illustrating the process with which adaptive receiver thresholds are dynamically calculated, according to a preferred embodiment of the present invention.

The process of the first preferred embodiment begins at Block 500 of FIG. 5A. FIG. 5A represents the logic used in computing a number of values that are used subsequently (by Blocks 535, 540, and 545 of FIG. 5B) to detect a foreign protocol. (As discussed above, a foreign protocol is one not using the techniques of the present invention.) At Block 500, a time averaging coefficient, "Avg_Coef" is computed. This value will be used to detect a foreign protocol, and is also used if a foreign protocol is detected, and is inapplicable otherwise. Avg_Coef is set to the smaller of a DCS averaging limit or the result of dividing the measurement interval by the DCS averaging interval, according to the following equation:

$$\text{Avg\_Coef} = \min\left[\text{DCS\_Averaging\_Limit}, \frac{\text{Measurement\_Interval}}{\text{DCS\_Averaging\_Interval}}\right]$$

The variable "Measurement_Interval" corresponds to the time since the most recent rate request message was received, computed as the receiver's delay (T4−T2). In the preferred embodiment, the averaging limit is a constant value of 0.2 seconds, and the averaging interval is a constant value of 3 seconds. The averaging coefficient computed by this equation is used by Blocks 505 and 515 of the first preferred embodiment in order to weight recent values from the current delay change more heavily than prior values.

At Block 505, a filtering value is computed that will enable excluding delay change values from further computations when those values are statistically remote from the experienced norm. These remote delay change values are referred to herein as "outliers". In the first preferred embodiment, this computation is only done when the current delay change is greater than zero (i.e. the most-recently-received rate request experienced more delay in the network than its predecessor did), and is performed according to the following equations:

$$\text{DC\_err} = \text{delay\_change} - \text{DC\_pos\_mean}$$

$$\text{DC\_pos\_mean} = \text{DC\_pos\_mean} + (\text{DC\_err} * \text{Avg\_Coef}/2)$$

$$\text{DC\_dev} = \text{DC\_dev} + (|\text{DC\_err}| - \text{DC\_dev}) * \text{Avg\_Coef}$$

$$\text{DC\_Threshold} = (2 * \text{DC\_pos\_mean}) + (4 * \text{DC\_dev})$$

In the first of these four equations, a value "DC_err" is computed that represents the difference between the current delay change value and the mean positive delay change experienced over the recent past (i.e. several measurement intervals). In the second equation, this DC_err value is multiplied by the Avg_Coef value computed at Block 500, and the result is divided by 2. The mean positive delay change is then added to the result of the division by 2, computing a new mean positive delay change. The third equation subtracts the deviation computed over the measurement interval from the absolute value of DC_err (computed in the first equation); multiplies the result by Avg_Coef (from Block 500); and then adds the deviation to the result of the multiplication to determine the new value of the deviation. The final equation computes "DC_Threshold", which will be used in the test in Block 510. As shown in the equations, DC_Threshold is the sum of (2 times the mean positive delay change) and (4 times the deviation).

At Block 510, the DC_Threshold value computed in Block 505 is compared to the current value of delay_change. If delay_change is greater than or equal to DC_Threshold, then this is considered an outlier (i.e. Block 510 has a positive result) and this delay_change value will be excluded from the further calculations that are attempting to detect a foreign protocol (by bypassing Blocks 515 and 520). When the delay_change value is less than DC_Threshold, Block 510 has a negative result, and processing continues at Block 515.

The current delay change is factored into the computations for a foreign protocol at Block 515, calculating new values for the DCS mean and variance using the following equations:

$$\text{DCS\_mean} = (\text{Avg\_Coef} * \text{delay\_change\_sum}) +$$
$$((1 - \text{Avg\_Coef}) * \text{DCS\_mean})$$

$$\text{DCS\_mean\_squared} = (\text{Avg\_Coef} * \text{delay\_change\_sum}^2) +$$
$$((1 - \text{Avg\_Coef}) * \text{DCS\_mean\_squared}))$$

$$\text{DCS\_variance} = \text{DCS\_mean\_squared} - \text{DCS\_mean}^2$$

In the first of these three equations, a value "DCS_mean" is computed that represents the mean running value of the DCS. This computation adds (Avg_Coef times the delay_change_sum) and ((1 minus Avg_Coef) times the prior mean DCS value). The second equation computes the DCS_mean_squared value, which is the sum of (Avg_Coef times the square of delay_change_sum) and ((1 minus Avg_Coef) times the prior DCS_mean_squared value). The final equation computes a new variance for the DCS by subtracting (the square of DCS_mean) from the value of the variable DCS_mean_squared.

Block 520 keeps track of the maximum value of the DCS that has been detected during a small time period, which in the preferred embodiment is 10 measurement intervals (again, not including outliers in the computations). A variable DCS_Max_Overall is used to store this value, which will be used in the logic of FIG. 5B if a foreign protocol is detected. The current value of the variable delay_change_sum (computed at Block 425 or initialized in Block 415) is compared to the prior value of the variable DCS_Max_Overall: if delay_change_sum is greater, then its value becomes the new value of DCS_Max_Overall.

Block 525 increments the counter DCS_window_count, which is used to ensure that DCS values are computed over a small time period. A small time period is desired so that the DCS values represent the network conditions only of the recent past, enabling the receiver adaptations provided by the present invention to be more responsive to current network conditions than the receiver adaptations of the prior art. Block 530 determines whether this counter has reached its maximum value, and if so, resets it to zero and also resets the variable DCS_Max_Overall (computed in Block 520) to zero. In the preferred embodiment, the maximum value for the counter is 10.

Figure 5B:
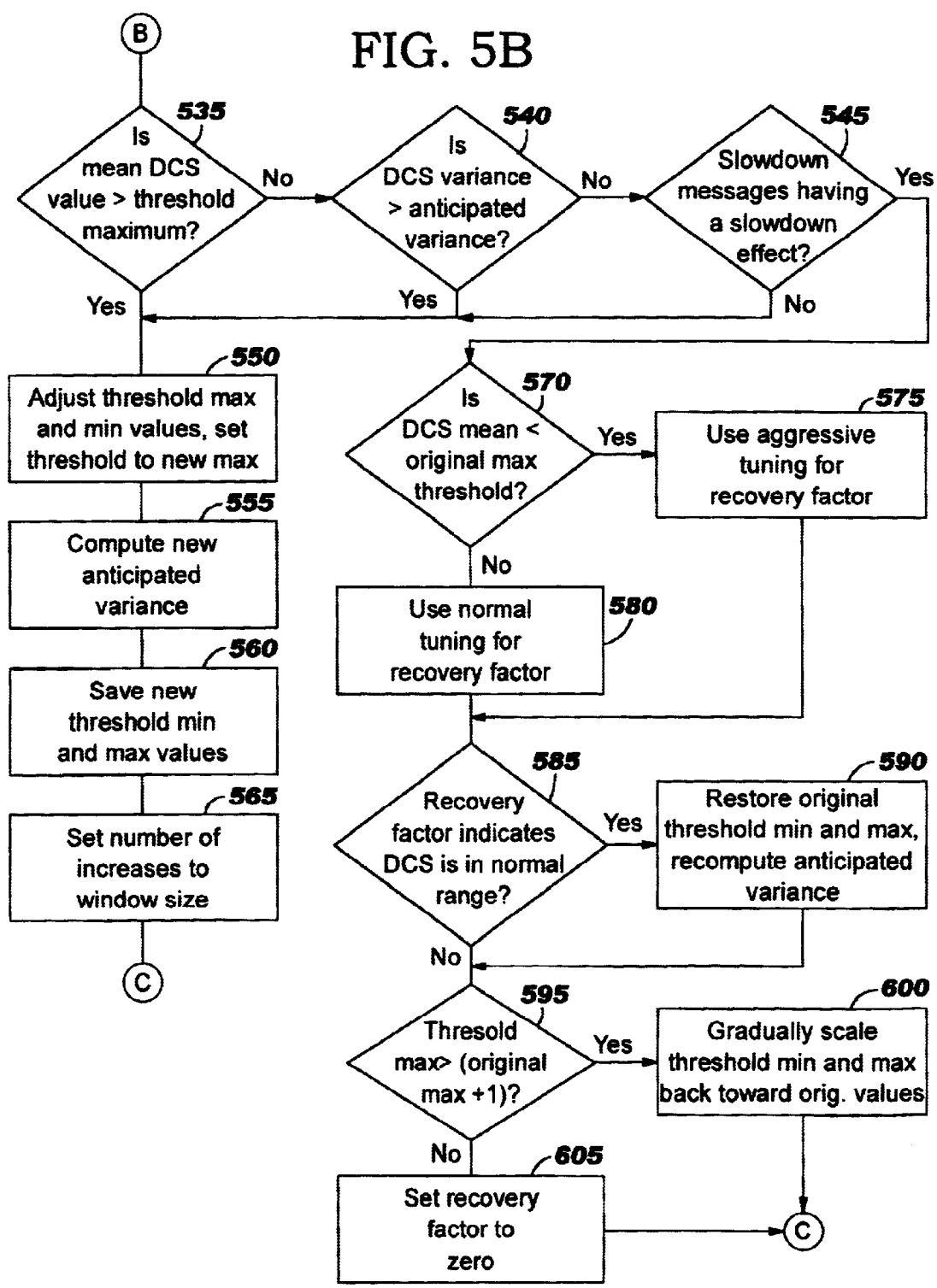

After Block 530 completes, processing continues at Block 535 of FIG. 5B. FIG. 5B represents the logic that is used to adapt the receiver threshold to compete with a foreign protocol (Blocks 535 through 565) and the logic that is used to gradually move the thresholds back into their original range after a foreign protocol is no longer present (Blocks 570 through 605).

The three comparisons depicted as the tests in Blocks 535, 540, and 545 are three indicators with which a foreign protocol is detected according to the present invention. At Block 535, a test is made to determine whether the mean DCS value, stored in the variable DCS_mean by Block 515, is greater than the present value of the upper bound on the threshold range. This upper bound will be referred to herein as "Present_Thr_Max". If this test has a positive result, i.e. the average DCS value is larger than the highest expected threshold, this suggests that a foreign protocol is present. Accordingly, the receiver thresholds will be adapted to the presence of the foreign protocol by transferring control to Block 550. Otherwise, if the test at Block 535 has a negative result, the next indicator is checked at Block 540. Block 540 asks whether the variable "DCS_variance" (computed by Block 515) is greater than an anticipated variance value stored in the variable "Anticipated_Variance". If so, then this also indicates that a foreign protocol is present, and control transfers to Block 550. Otherwise, the third indicator is checked in Block 545. Block 545 asks whether the slowdown, or decrease, messages that the receiver has been sending to the sender on the recent rate response messages are in fact having a slowdown effect. This test corresponds to the following expression:

(N_Fraction <N_Fraction_Threshold) AND (N_Fraction_Trend >N_Trend_Threshold)

This expression compares the "N_Fraction" value (representing the percentage of recent responses that were "increase" messages) computed below by Block 620 (i.e. during a previous iteration of the monitoring logic) to a threshold value for N_Fraction, and also compares the trend in sending increase message (represented by "N_Fraction_Trend" and computed by Block 640 in a previous iteration) to a threshold for this trend. The threshold values N_Fraction_Threshold and N_Trend_Threshold are constants, which are set in the preferred embodiment to 0.25 and 0.5, respectively. As with other similar constants, these particular value were chosen based on the inventors' engineering judgment and experience. Selection of a different constant value does not deviate from the scope of the invention. When the percent of increase messages is below the increase message threshold and the trend in sending increase messages is above the trend threshold, this indicates that the receiver is sending decrease messages but they are not having the expected effect. Therefore, a foreign protocol is most likely present in the network. In this situation, where Block 545 has a negative response, control will transfer to Block 550. Otherwise, when Block 545 has a positive response, none of the three indicators of a foreign protocol are currently present, and control will transfer to Block 570.

At Block 550, a foreign protocol has been detected. The receiver thresholds will now be adapted to match the behavior of the foreign protocol, resulting in fairness between the protocols. Block 550 begins this adaptation by adjusting the upper and lower bounds on the threshold, and setting the receiver threshold (i.e. the value against which delay_change_sum is compared to determine whether to send an increase or a decrease message) to the new upper bound. The following equations show how these actions are performed:

Present_Thr_Max = max[DCS_Max_Overall + Range_Size, Original_Thr_Max]

Present_Thr_Min = max[DCS_Max_Overall, Original_Thr_Min]

-continued
Receiver_Threshold = Present_Thr_Max

The first of these equations sets the present upper bound on the threshold to the larger of (1) the sum of (a) the highest experienced value of the DCS over the measurement interval and (b) the range size for the current row 660 from the link rate table, and (2) the original upper bound on the threshold (the value 670 in FIG. 6) for the current row. The second equation sets the present lower bound for the threshold to be the larger of (1) the highest experienced value of the DCS over the measurement interval and (2) the original lower bound on the threshold (the value 675 in FIG. 6) for the current row. The third equation sets the new receiver threshold value, as just described.

Block 555 computes a new value for the Anticipated_Variance variable, that will be used in the next iteration of the test in Block 540, as the square of Present_Thr_Max (which is the new upper bound on the threshold computed in Block 550). Block 560 saves the values of the new upper and lower bounds on the threshold by storing them in variables "Saved_Thr_Max" and "Saved_Thr_Min", respectively. Block 565 sets the number of increase messages, stored in variable "Number_Of_Increases", to the window size, stored in the variable "Window_Size". Processing then continues by transferring control to Block 615 of FIG. 5C.

Block 570 is reached when no foreign protocol was detected during this iteration. The logic of Blocks 570 through 605 gradually moves the threshold values back to their original settings, restoring the normal operation of the adapter receiver thresholds to the non-competer mode of operation. Block 570 begins this process by asking whether the value DCS_mean is less than the original threshold upper bound (element 670 of FIG. 6) for this row from the link rate table. If this test has a positive result, then the DCS has moved back into the normal range for this iteration, so control will transfer to Block 575 where a variable "Recovery_Factor" is increased. In the preferred embodiment, the processing of Block 575 comprises the following computation:

Recovery_Factor=(0.95 * Recovery_Factor )+0.05

If the test at Block 570 has a negative result, then the DCS is not in the normal range, so the Recovery_Factor is decreased in Block 580. In the preferred embodiment, the following computation is used:

Recovery_Factor=0.95 * Recovery_Factor

It is to be noted that the constant values used in the computations for Blocks 575 and 580 represent weighting factors that were chosen somewhat intuitively by the inventors. Other constant values may be used instead of those shown without deviating from the inventive concepts disclosed herein.

Block 585 checks to see if the recovery factor indicates that the DCS has returned to the normal range for long enough, such that the competer mode of operation can be turned off and normal mode resumed. When the constant values shown for Blocks 575 and 580 are used, the preferred embodiment of the test of Block 585 compares the variable Recovery_Factor to the constant value 0.95. When Recovery_Factor is greater than 0.95, then competer mode is turned off by transferring control to Block 590. Otherwise, the Recovery_Factor value is not yet high enough to indicate that the recovery process is complete, so control transfers to Block 595.

At Block 590, the original upper and lower bounds on the threshold are restored. These values correspond to elements 670 and 675 for the current row from the link rate table. A new value is then computed for the Anticipated_Variance variable, that will be used in the next iteration of the test in Block 540, as the square of Present_Thr_Max (which is the just-restored upper bound on the threshold). These operations correspond to the following equations:

$$Present\_Thr\_Max = Original\_Thr\_Max$$

$$Present\_Thr\_Min = Original\_Thr\_Min$$

$$Anticipated\_Variance = Present\_Thr\_Max^2$$

Block 595 compares the current upper bound on the threshold, Present_Thr_Max, to the sum of 1 plus the value Original_Thr_Max. If Present_Thr_Max is greater, then Block 600 computes new values for the current upper and lower bounds on the threshold to gradually scale the range back to normal. Otherwise, control transfers to Block 605.

Block 600 performs a scaling process on the threshold bounds according to the following equations:

$$Present\_Thr\_Max = \max[Present\_Thr\_Max - (Saved\_Thr\_Max -$$
$$Original\_Thr\_Max) * .01, Original\_Thr\_Max]$$
$$Present\_Thr\_Min = \max[Present\_Thr\_Min - (Saved\_Thr\_Min -$$
$$Original\_Thr\_Min) * .01, Original\_Thr\_Min]$$
$$Anticipated\_Variance = Present\_Thr\_Max^2$$
$$DCS\_Max\_Overall = 0.0$$

The first of these 4 equations determines the new upper bound on the threshold. It will be set to the larger of (1) the present upper bound less one percent of the difference between the saved maximum threshold (saved in Block 560 during a previous iteration through the logic of FIG. 5B) and the original upper bound 670, and (2) the original upper bound. This computation ensures that the new upper bound is not set lower than the original value that is applicable for this link rate setting. (It should be noted that the constant value 0.01 has been determined by the inventors by experimentation and simulation, and is thought to be an appropriate multiplier. In a proper setting, other constant values may be appropriate and may be used without deviating from the scope of the present invention.) The second equation then determines the new lower bound in an analogous manner. The anticipated variance is recalculated next, using the new value of the upper bound. Finally, DCS_Max_Overall is set to zero. This ensures that subsequent calculations will use a value that is applicable over their recent interval, and not one that corresponded to previous operations during competer mode. With the processing of Block 600 now complete, control transfers to Block 615 of FIG. 5C.

Block 605 is reached when the test in Block 595 had a negative result. The processing of Block 605 comprises setting the variable Recovery_Factor to zero. This indicates that the recovery of operations from competer mode to normal mode is complete. Processing then continues at Block 615 of FIG. 5C.

Blocks 615 through 640 compute values that will be used in the absence of a foreign protocol, and which correspond to the remaining two of the three monitors used by the first preferred embodiment of the present invention. The first of these two monitors adapts the threshold by calculating the percentage of messages where the receiver requested the sender to increase the transmission rate. This percentage is calculated based on the messages sent over a recent time interval, enabling the present invention to provide quick response to changing network conditions. In the preferred embodiment, this interval is measured by (i) the last 5 rate request, rate reply message pairs or (ii) the last one second, whichever represents a greater time period. This interval will be referred to herein as the variable "Window_Size". (Other approaches to measuring the window size interval may be appropriate for specific networks, and a different interval measurement may be used without deviating from the inventive concepts disclosed herein.) The rationale for this monitor is that when a high percentage of "increase" messages are being sent, this indicates that the network is stable and uncongested. Therefore, the threshold can be increased to allow the system to be more tolerant of transient network queues or system noise. That is, the value of the threshold at which the receiver sends "decrease" or "slow down" messages is increased, so that the receiver is less likely to send a decrease message. On the other hand, if a significant percentage of decrease messages have been sent in this interval, the network may be congested. In that case, the threshold value will be reduced to be more sensitive to network conditions. Lowering the threshold in this situation also allows the system to react before severe congestion occurs, in order to prevent serious problems. The adaptation of the receiver threshold in response to this monitor is performed at Block 650.

Figure 5C:
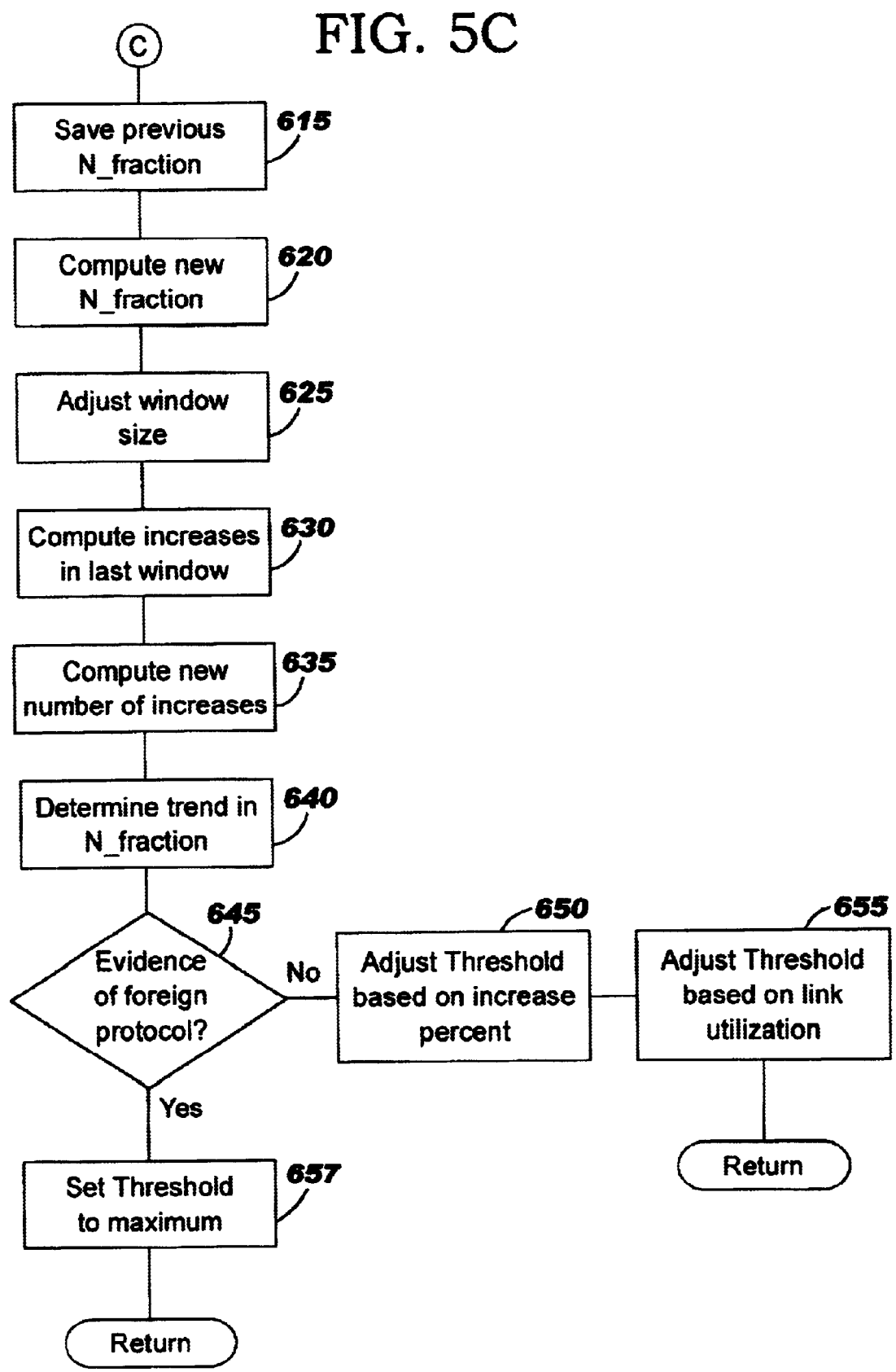

The second of the two monitors represented by FIG. 5C adapts the threshold in a manner that balances bandwidth allocation among the connections that are sharing a given bottlenecked link, to ensure that each connection gets a fair share of that resource (and the associated buffers and processor cycles for performing routing operations). This technique enables a fair allocation of link capacity in the presence of sustained transmissions (i.e. those that use a large share of the link) to be made. A connection that is using a relatively high percentage of a shared bottleneck link will have its threshold decreased, so that the receiver will send decrease messages to the sender more often than it would if the threshold was not adapted. This gives other connections using the same bottlenecked resource (such as a new connection that is just ramping up) an opportunity to increase their transmission rate. This receiver threshold adaptation is performed at Block 655.

The values computed during operation of the logic of FIG. 5C, and how these values are used to adapt the thresholds for the two monitors just described, will now be discussed in detail. At Block 615, the previous value of the variable N_Fraction (computed in a previous iteration of the processing depicted in FIG. 5C) is stored in a variable that will be referred to as "previous_N_Fraction". This value will be used below, in Block 640, to determine the current trend in sending increase messages to the sender.

Block 620 computes a new value for the variable "N_Fraction". This computation is only performed when the variable "Window_Size" is greater than zero, and comprises dividing a running count of the number of increase messages that has been sent during the measurement interval by the size of the interval (i.e. by the variable Window_Size). The count of increases is stored in a variable referred to herein as "Number_Of_Increases". This new value of N_Fraction then represents the percentage of increase messages sent during this Window_Size interval.

At Block 625, the size interval corresponding to Window_Size is adjusted so that the percentage represented by N_Fraction will represent a fairly constant period. In the preferred embodiment where Window_Size corresponds to the larger of 5 rate message exchanges or 1 second, as discussed above, this adjustment to the Window_Size enables it to continuously represent the larger of these values. The following equations show how this adjustment is computed:

$$\text{Window\_Size} = \frac{1.0}{\text{Measurement\_Interval}}$$

If Window_Size < 5.0

Then

Window_Size = 5.0

As stated previously, the variable "Measurement_Interval" corresponds to the time since the most recent rate request message was received. Suppose, for example, that one second has elapsed since receipt of the last rate request message. In this situation, the value of Measurement_Interval is 1, so that the first equation computes a value of 1 for the window size (corresponding to a one-second interval). The "If" clause of the following statement will then be true, so that the Window_Size value will be set to 5. In other words, the time required to process 5 message pairs will be used for Window_Size in order to compute representative values. As an alternative example, suppose that one-tenth of a second has elapsed since the last rate request message, so that Measurement_Interval has the value 0.1. Then the first equation above will compute a value for Window_Size of 10. The "Then" clause of the IF statement will not be invoked, so that this value will be used for the Window_Size in subsequent computations. In other words, 10 message pairs will be processed each second at this rate, so network conditions will be observed over a one-second Window_Size interval. By recomputing Window_Size for each iteration of the logic of FIGS. 5A–5C (that is, each time a new rate request message arrives), it will continuously represent current network conditions.

Block 630 then computes the number of increase messages that were previously sent during the period of time represented by the new Window_Size interval, in order to scale the number of increases according to changes in Window_Size. This computation is shown by the following equation:

Number_Of_increases=N_Fraction * Window_Size

Block 635 computes a new value for the number of increases, which will include the message that is being sent in response to the current rate request. This is performed according to the following algorithm:

If Message = Increase

Then

Number_Of_Increases = [(Window_Size − 1) * N_Fraction] + 1

Else

Number_Of_Increases = [(Window_Size − 1) * N_Fraction]

As can be seen by this algorithm, a constant value "1" is added to the Number_Of_Increases when the current message was "increase", and is not added otherwise. The computation of (Window_Size−1) * N_Fraction scales the increases for the just-computed Window_Size value (from Block 625).

Block 640 determines the current trend in the value of N_Fraction. In the preferred embodiment, the following algorithm is used:

If N_Fraction < previous_N_Fraction

Then

N_Fraction_Trend = (0.8 * N_Fraction_Trend) + 0.2

Else

N_Fraction_Trend = (0.8 * N_Fraction_Trend)

The value previous_N_Fraction was stored above in Block 615. By comparing the current N_Fraction (computed at Block 620) to this stored previous value, a trend can be detected. When the current value is lower than the previous value, then fewer increases are being sent (i.e. a decrease message has been sent), indicating that congestion in the network is increasing. In that situation, the value of N_Fraction_Trend is multiplied by a constant value of 0.8, and a constant value of 0.2 is added to the result to determine a new value for this variable. Otherwise, when the trend is not toward sending fewer increase messages (i.e. increase messages are still being sent), the same computation is performed except that 0.2 is not added to the result. These constant values of 0.8 and 0.2 represent $\frac{4}{5}$ and $\frac{1}{5}$, and were chosen by the inventors to correspond to the expected number of 5 message pairs in the measurement interval. Use of these constant values in the computation of N_Fraction_Trend achieves a smoothing effect on the result. Other constant values may be used to achieve different smoothing of this value, without deviating from the scope of the present invention.

Block 645 tests whether a foreign protocol was detected during this iteration of the logic of FIGS. 5A through 5C. In the preferred embodiment, this test corresponds to comparing the value of Present_Thr_Max (set during processing of FIG. 5B) to the sum of (Original_Thr_Max and a constant value of 3). When the Present_Thr_Max value is less than or equal to this sum, the test in Block 645 has a negative result (i.e. a foreign protocol does not appear to be present) and control transfers to Block 650. Otherwise, control transfers to Block 657. (As has been stated, Original_Thr_Max is the value 670 from the current row of the link rate table.)

At Block 650, the receiver threshold is adapted based on the percentage of increase messages being sent. This is performed according to the following equation:

Receiver_Threshold=Receiver_Threshold_Minimum +(Range_Size * N_Fraction)

This equation performs an interpolation procedure, using N_Fraction to choose a new threshold value in the range between the upper and lower bounds on the threshold. Receiver_Threshold_Minimum is the lower bound 675 on the threshold for the current row from the link rate table. If N_Fraction is zero, for example, meaning that no increase messages are being sent, this equation sets the threshold to its minimum value so that there is a greater likelihood of sending decrease messages. If N_Fraction is one, meaning that only increase messages are being sent, this equation will set the threshold to its maximum value, increasing the likelihood of sending further increase messages.

Block 655 adapts the receiver threshold based on the link utilization for this connection. This adaptation uses the following algorithm:

$$\text{If Smoothed\_Rate} < \text{rcv\_slowest\_link\_rate}$$

Then $$\text{rate\_scaler} = 1 - \frac{\text{Smoothed\_Rate}}{\text{rcv\_slowest\_link\_rate}}$$

$$\text{Receiver\_Threshold} = \max[(\text{rate\_scaler} * \text{Receiver\_Threshold}),$$

$$\text{Receiver\_Threshold\_Minimum}]$$

Else $$\text{Receiver\_Threshold} =$$

$$\max\left[\frac{(\text{rcv\_slowest\_link\_rate} * \text{Receiver\_Threshold\_Minimum})}{\text{Smoothed\_Rate}}, 2.0\right]$$

The value of "Smoothed_Rate" in the preferred embodiment is computed from the value of Actual_Rate (using calculations that are not shown, where the prior smoothed rate is multiplied by ¾ and added to the result of multiplying the current actual rate by ¼). Actual_Rate indicates how fast data is currently being received. This Smoothed_Rate value is compared to the slowest link rate value (element 665 in FIG. 6) for the current row from the link rate table. In the normal case, the Smoothed_Rate is lower than the slowest link rate that the network can handle because at least one link in the path operates at a slowest speed (and is therefore the bottleneck for the connection). In this normal case, a rate_scaler value is computed by subtracting the percent of capacity being used (i.e. Smoothed_Rate divided by rcv_slowest_link_rate) from 1. This result represents the percent of unused link capacity.

Following calculation of the rate_scaler value, a new Receiver_Threshold is computed. This value is the larger of (1) rate scaler multiplied by the previous Receiver_Threshold value, and (2) Receiver_Threshold_Minimum, representing the lower bound 675 on the threshold. When Smoothed_Rate is not lower than the slowest link rate, however, data is being received faster than expected. This is a transient condition. For example, a lot of traffic may have been queued up during a burst situation, and transmission will be backing off as the burst ends. Or, the wrong row from the link rate table may be in use, so that the bottleneck link is not actually as slow as the receiver expects. This will be detected by the sender, using techniques which do not form part of the present invention. A message will be sent by the sender, requesting the receiver to use a different row from the link rate table for further computations. When this transient situation exists, the threshold will be allowed to temporarily drift below the minimum by the computation of Receiver_Threshold in the "Else" clause. This new threshold is computed as the larger of (1) the rcv_slowest_link_rate value 665 multiplied by the lower bound on the threshold, this result then being divided by the Smoothed_Rate, and (2) a constant value of 2.

Note that Block 655 is a further adaptation of the results of the adaptation performed in Block 650. In an alternative embodiment, discussed below, these adaptations may be used separately.

Block 657 is reached when Block 645 detected a foreign protocol. The adaptations of Blocks 650 and 655 are not used in that situation, because the logic depicted in FIG. 5B provides the appropriate threshold adaptation in the presence of a foreign protocol. Accordingly, Block 657 sets the Receiver_Threshold value to the current upper bound on the threshold, which is the value stored in Present_Thr_Max.

Following completion of Blocks 650 and 655, or alternatively Block 657, control returns to the invoking logic (Block 435 of FIG. 4), which will use the newly-calculated Receiver_Threshold value in Block 440 to determine whether to send an increase or decrease message to the sender.

FIRST ALTERNATIVE PREFERRED EMBODIMENT

In an alternative preferred embodiment, the three indicators of network conditions may be used separately, or in other combinations than shown in the first preferred embodiment. The logic of FIGS. 5A through 5C may be used in implementing these alternative combinations, where the inapplicable processing (discussed below) is simply omitted.

When the percentage of increases is not being monitored, the logic of the following blocks from FIGS. 5A through 5C may be omitted: Blocks 630, 635, and 650 of FIG. 5C. When the link utilization is not being monitored, the logic of the following block may be omitted: Block 655 of FIG. 5C. When presence of a foreign protocol is not being monitored, the following blocks may be omitted: all of FIGS. 5A and 5B; Blocks 615, 640, 645, and 657 of FIG. 5C.

SECOND ALTERNATIVE PREFERRED EMBODIMENT

In another alternative preferred embodiment, the logic of all three monitors may be implemented as shown in FIGS. 5A through 5C, where an additional facility (not shown) is provided such as a configuration menu whereby a user (e.g. a network operator or systems administrator) can selectively enable specific monitors at different times. For this alternative embodiment, it will be obvious to one of ordinary skill in the art how to construct such a facility for accepting user input. Further, it will be obvious that an optimum way of modifying the logic of FIGS. 5A through 5C to respond to this user selection facility, rather than applying tests to individual blocks of computations, is to (1) precede Block 535 by a test asking whether the presence of a foreign protocol is being monitored, and transfer control to Block 615 when this test has a negative result; (2) precede Block 650 by a test that asks whether the percentage of increases is being monitored, and to bypass Block 650 when this test has a negative result; and (3) precede Block 655 by a test that asks whether the link utilization rate is being monitored, and to bypass Block 655 when this test has a negative result.

While the present invention has been described relative to adapting thresholds used in an implementation of High Performance Routing networks, this is by way of illustration and not of imitation. The inventive concepts defined herein may be used advantageously in any system of network flow control providing similar information flows between a sender and a receiver, and with protocols other than HPR in which dynamic adaptation of receiver thresholds for rate-based flow control can be used advantageously according to the present invention. Thus, while the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and such modifications as fall within the spirit and scope of the invention.

We claim:

1. Computer readable code for adapting receiver thresholds to improve rate-based flow control in a data communications network, said computer readable code embodied on one or more computer readable media and comprising:

computer readable code means for programmatically detecting whether a foreign protocol is operating in said network, said foreign protocol being a protocol that does not use adaptive rate-based flow control;

computer readable code means for programmatically setting a receiver threshold to a maximum value when said foreign protocol is detected; and computer readable code means for using said receiver threshold for rate-based flow control when responding to a rate request received from a sender of data, further comprising:

computer readable code means for comparing said receiver threshold to an amount of network delay experienced over a recent time interval when receiving a sequence of at least two of said rate requests from said sender; and computer readable code means for responding to said received rate request by sending a response, to said sender, indicating that a rate of sending said data should be decreased if said computer readable code means for comparing determines that said amount of network delay exceeds said receiver threshold, but that said rate of sending said data can be increased otherwise.

2. Computer readable code for adapting receiver thresholds to improve rate-based flow control in a data communications network, said computer readable code embodied on one or more computer readable media and comprising:

computer readable code means for programmatically monitoring a percentage of rate-based flow-control increase messages sent by a receiver to a sender during a recent interval;

computer readable code means for using said percentage of increase messages to programmatically interpolate a receiver threshold between a maximum value and a minimum value; and computer readable code means for using said receiver threshold for rate-based flow control when responding to a rate request received from said sender, further comprising:

computer readable code means for comparing said receiver threshold to an amount of network delay experienced over a recent time interval when receiving a sequence of at least two of said rate requests from said sender; and computer readable code means for responding to said received rate request by sending, as a response to said sender, a rate-based flow-control message indicating that a rate of sending data by said sender should be decreased if said computer readable code means for comparing determines that said amount of network delay exceeds said receiver threshold, and for sending a rate-based flow-control message indicating that said rate can be increased otherwise.

3. Computer readable code for adapting receiver thresholds to improve rate-based flow control in a data communications network, said computer readable code embodied on one or more computer readable media and comprising:

computer readable code means for programmatically monitoring a link utilization rate of a connection during a recent interval to determine whether excess bandwidth capacity is available;

computer readable code means for using said link utilization rate to programmatically adjust a receiver threshold such that, when said computer readable code means for programmatically monitoring determines that there is excess bandwidth capacity available, said receiver threshold is increased; and computer readable code means for using said receiver threshold for rate-based flow control when responding to a rate request received from a sender of data, further comprising:

computer readable code means for comparing said receiver threshold to an amount of network delay experienced over a recent time interval when receiving a sequence of at least two of said rate requests from said sender; and computer readable code means for responding to said received rate request by sending, as a response to said sender, a rate-based flow-control message indicating that a rate of sending said data by said sender should be decreased if said computer readable code means for comparing determines that said amount of network delay exceeds said receiver threshold, and for sending a rate-based flow-control message indicating that said rate can be increased otherwise.

4. Computer readable code for adapting receiver thresholds according to claim 1, wherein said computer readable code means for programmatically detecting further comprises:

computer readable code means for programmatically monitoring an average value of a delay change sum, wherein said delay change sum reflects said amount of network delay experienced over said recent time interval;

computer readable code means for programmatically monitoring a variance in said delay change sum;

computer readable code means for programmatically monitoring whether said sent responses which indicate that said rate should be decreased are actually resulting in a decrease in said amount of network delay;

computer readable code means for programmatically determining that said foreign protocol is detected when said monitored average value is higher than an expected average value;

computer readable code means for programmatically determining that said foreign protocol is detected when said monitored variance is larger than an expected variance; and computer readable code means for programmatically determining that said foreign protocol is detected when said sent responses which indicate that said rate should be decreased are not actually resulting in said decrease.

5. A system for adapting receiver thresholds to improve rate-based flow control in a data communications network, comprising:

means for programmatically detecting whether a foreign protocol is operating in said network, said foreign protocol being a protocol that does not use adaptive rate-based flow control; and means for programmatically setting a receiver threshold to a maximum value when said foreign protocol is detected; and means for using said receiver threshold for rate-based flow control when responding to a rate request received from a sender of data, further comprising:

means for comparing said receiver threshold to an amount of network delay experienced over a recent time interval when receiving a sequence of at least two of said rate requests from said sender; and means for responding to said received rate request by sending a response, to said sender, indicating that a rate of sending said data should be decreased if said means for comparing determines that said amount of network delay exceeds said receiver threshold, but that said rate of sending said data can be increased otherwise.

6. A system for adapting receiver thresholds to improve rate-based flow control in a data communications network, comprising:

means for programmatically monitoring a percentage of rate-based flow-control increase messages sent by a receiver to a sender during a recent interval;

means for using said percentage of increase messages to programmatically interpolate a receiver threshold between a maximum value and a minimum value; and means for using said receiver threshold for rate-based flow control when responding to a rate request received from said sender, further comprising:

means for comparing said receiver threshold to an amount of network delay experienced over a recent time interval when receiving a sequence of at least two of said rate requests from said sender; and means for responding to said received rate request by sending, as a response to said sender, a rate-based flow-control message indicating that a rate of sending data by said sender should be decreased if said means for comparing determines that said amount of network delay exceeds said receiver threshold, and for sending a rate-based flow-control message indicating that said rate can be increased otherwise.

7. A system for adapting receiver thresholds to improve rate-based flow control in a data communications network, comprising:

means for programmatically monitoring a link utilization rate of a connection during a recent interval to determine whether excess bandwidth capacity is available;

means for using said link utilization rate to programmatically adjust a receiver threshold such that, when said means for programmatically monitoring determines that there is excess bandwidth capacity available, said receiver threshold is increase; and means for using said receiver threshold for rate-based flow control when responding to a rate request received from a sender of data, further comprising:

means for comparing said receiver threshold to an amount of network delay experienced over a recent time interval when receiving a sequence of at least two of said rate requests from said sender; and means for responding to said received rate request by sending, as a response to said sender, a rate-based flow-control message indicating that a rate of sending said data by said sender should be decreased if said means for comparing determines that said amount of network delay exceeds said receiver threshold, and for sending a rate-based flow-control message indicating that said rate can be increased otherwise.

8. The system for adapting receiver, thresholds according to claim 5, wherein said means for programmatically detecting further comprises:

means for programmatically monitoring an average value of a delay change sum, wherein said delay change sum reflects said amount of network delay experienced over said recent time intervals;

means for programmatically monitoring a variance in said delay change sum;

means for programmatically monitoring whether said sent responses which indicate that said rate should be decreased are actually resulting in a decrease in said amount of network delay;

means for programmatically determining that said foreign protocol is detected when said monitored average value is higher than an expected average value;

means for programmatically determining that said foreign protocol is detected when said monitored variance is larger than an expected variance; and means for programmatically determining that said foreign protocol is detected when said sent responses which indicate that said rate should be decreased are not actually resulting in said decrease.

9. A method for adapting receiver thresholds to improve rate-based flow control in a data communications network, comprising the steps of:

programmatically detecting whether a foreign protocol is operating in said network, said foreign protocol being a protocol that does not use adaptive rate-based flow control;

programmatically setting a receiver threshold to a maximum value when said foreign protocol is detected; and using said receiver threshold for rate-based flow control when responding to a rate request received from a sender of data, further comprising the steps of:

comparing said receiver threshold to an amount of network delay experienced over a recent time interval when receiving a sequence of at least two of said rate requests from said sender; and responding to said received rate request by sending a response, to said sender, indicating that a rate of sending said data should be decreased if said comparing step determines that said amount of network delay exceeds said receiver threshold, but that said rate of sending said data can be increased otherwise.

10. A method for adapting receiver thresholds to improve rate-based flow control in a data communications network, comprising the steps of:

programmatically monitoring a percentage of rate-based flow-control increase messages sent by a receiver to a sender during a recent interval;

using said percentage of increase messages to programmatically interpolate a receiver threshold between a maximum value and a minimum value; and using said receiver threshold for rate-based flow control when responding to a rate request received from said sender, further comprising the steps of:

comparing said receiver threshold to an amount of network delay experienced over a recent time interval when receiving a sequence of at least two of said rate requests from said sender; and responding to said received rate request by sending, as a response to said sender, a rate-based flow-control message indicating that a rate of sending data by said sender should be decreased if said comparing step determines that said amount of network delay exceeds said receiver threshold, and for sending a rate-based flow-control message indicating that said rate can be increased otherwise.

11. A method for adapting receiver thresholds to improve rate-based flow control in a data communications network, comprising the steps of:

programmatically monitoring a link utilization rate of a connection during a recent interval to determine whether excess bandwidth capacity is available;

using said link utilization rate to programmatically adjust a receiver threshold such that, when said programmatically monitoring step determines that there is excess bandwidth capacity available, said receiver threshold is increased; and using said receiver threshold for rate-based flow control when responding to a rate request received from a sender of data, further comprising the steps of:

comparing said receiver threshold to an amount of network delay experienced over a recent time interval when receiving a sequence of at least two of said rate requests from said sender; and responding to said received rate request by sending, as a response to said sender, a rate-based flow-control message indicating that a rate of sending said data by said sender should be decreased if said comparing step determines that said amount of network delay exceeds said receiver threshold, and for sending a rate-based flow-control message indicating that said rate can be increased otherwise.

12. The method for adapting receiver thresholds according to claim 9, wherein said programmatically detecting step further comprises the steps of:

programmatically monitoring an average value of a delay change sum, wherein said delay change sum reflects said amount of network delay experienced over said recent time intervals;

programmatically monitoring a variance in said delay change sum;

programmatically monitoring whether said sent responses which indicate that said rate should be decreased are actually resulting in a decrease in said amount of network delay;

programmatically determining that said foreign protocol is detected when said monitored average value is higher than an expected average value;

programmatically determining that said foreign protocol is detected when said monitored variance is larger than an expected variance; and programmatically determining that said foreign protocol is detected when said sent responses which indicate that said rate should be decreased are not actually resulting in said decrease.

13. Computer readable code for adapting receiver thresholds according to claim 1, wherein said computer readable code means for programmatically setting operates to allow said sender to compete for resources more fairly with another sender who is using said foreign protocol.

14. Computer readable code for adapting receiver thresholds according to claim 2, wherein said computer readable code means for programmatically interpolating operates to allow said sender to increase said rate when congestion is not being experienced in said data communications network.

15. Computer readable code for adapting receiver thresholds according to claim 3, wherein said computer readable code means for using said link utilization rate operates to balance bandwidth allocation among connections that are sharing a bottlenecked link.

16. The system for adapting receiver thresholds according to claim 5, wherein said means for programmatically setting operates to allow said sender to compete for resources more fairly with another sender who is using said foreign protocol.

17. The system for adapting receiver thresholds according to claim 6, wherein said means for programmatically interpolating operates to allow said sender to increase said rate when congestion is not being experienced in said data communications network.

18. The system for adapting receiver thresholds according to claim 7, wherein said means for using said link utilization rate operates to balance bandwidth allocation among connections that are sharing a bottlenecked link.

19. The method for adapting receiver thresholds according to claim 9, wherein said programmatically setting step operates to allow said sender to compete for resources more fairly with another sender who is using said foreign protocol.

20. The method for adapting receiver thresholds according to claim 10, wherein said programmatically interpolating step operates to allow said sender to increase said rate when congestion is not being experienced in said data communications network.

21. The method for adapting receiver thresholds according to claim 11, wherein said step of using said link utilization rate operates to balance bandwidth allocation among connections that are sharing a bottlenecked link.

* * * * *